United States Patent [19]

Geist

[11] Patent Number: 4,539,218

[45] Date of Patent: Sep. 3, 1985

[54] SYNTHETIC RESIN

[75] Inventor: Michael Geist, Münster, Fed. Rep. of Germany

[73] Assignee: BASF Farben & Fasern AG, Hamburg, Fed. Rep. of Germany

[21] Appl. No.: 688,198

[22] Filed: Jan. 2, 1985

Related U.S. Application Data

[62] Division of Ser. No. 399,292, Jul. 19, 1982, Pat. No. 4,522,981.

[30] Foreign Application Priority Data

Aug. 1, 1981 [DE] Fed. Rep. of Germany ....... 3130545

[51] Int. Cl.³ .............................................. B01D 5/00
[52] U.S. Cl. ..................................... 427/27; 427/386; 525/124; 526/273
[58] Field of Search .................. 427/27, 386; 525/124; 526/273

[56] References Cited

U.S. PATENT DOCUMENTS 4,281,076  7/1981  Kamimura ......................... 525/124

FOREIGN PATENT DOCUMENTS 49-67142  12/1975  Japan .

*Primary Examiner*—Bernard Lipman
*Attorney, Agent, or Firm*—Wells & Wells

[57] ABSTRACT

The invention relates to a synthetic resin based on an acrylate copolymer containing epoxide groups and having a number average molecular weight of 1,000 to 30,000. The acrylate copolymer comprises (a) 20 to 90% by weight of an alkyl acrylate having 1 to 18 carbon atoms in the alkyl radical and/or a methacrylate having 1 to 20 carbon atoms in the alkyl radical, (b) 5 to 40% by weight of a hydroxyalkyl acrylate and/or methacrylate and (c) 5 to 40% by weight of glycidyl acrylate and/or methacrylate and/or one other olefinically unsaturated, polymerizable compound carrying an epoxide group, the total amount of components a, b and c being 100%. The hydroxyl groups of the acrylate copolymer have been reacted before or after the copolymerization was carried out at least partially with a partially blocked diisocyanate and/or polyisocyanate.

8 Claims, No Drawings

SYNTHETIC RESIN

This is a division of application Ser. No. 399,292, filed July 19, 1982, now U.S. Pat. No. 4,522,981.

BACKGROUND OF THE INVENTION

The invention relates to a synthetic resin based on an acrylate copolymer containing epoxide groups and having a number average molecular weight of 1,000 to 30,000.

U.S.A. Pat. Nos. 2,604,463 and 3,297,621 disclose baking finishes based on glycidyl acrylate or methacrylate.

Acrylate copolymers containing epoxide groups are also known from German Offenlegungsschrift No. 2,064,916. These known copolymers are hardened on baking with the use of hardeners. Polycarboxylic acids, polyanhydrides and polyamines are known for use as hardeners.

SUMMARY OF THE INVENTION

The object of the present invention is to provide a synthetic resin of the abovementioned type which can be hardened without an additional hardener, i.e. which is self-crosslinking.

This object is achieved according to the invention by the acrylate copolymer comprising (a) 20 to 90% by weight of an alkyl acrylate having 1 to 18 carbon atoms in the alkyl radical and/or a methacrylate having 1 to 20 carbon atoms in the alkyl radical, (b) 5 to 40% by weight of a hydroxyalkyl acrylate and/or methacrylate and (c) 5 to 40% by weight of glycidyl acrylate and/or methacrylate and/or one other olefinically unsaturated, polymerizable compound carrying an epoxide group, the total amount of components a, b and c being 100%, and reacting the hydroxyl groups of the acrylate copolymer before or after the copolymerization has been carried out at least partially with a partially blocked diisocyanate and/or polyisocyanate.

DESCRIPTION OF THE PREFERRED EMBODIMENTS

The following acrylates are preferably used as component a: methyl acrylate, ethyl acrylate, n-propyl acrylate, isopropyl acrylate, butyl acrylate, 2-ethylhexyl acrylate and cyclohexyl acrylate.

Methacrylates preferable for use as component a are: methyl methacrylate, ethyl methacrylate, n-propyl methacrylate, isopropyl methacrylate, n-butyl methacrylate, isobutyl methacrylate, 2-ethylhexyl methacrylate and cyclohexyl methacrylate.

Suitable hydroxyalkyl acrylates are in particular hydroxyethyl acrylate, hydroxy-n-propyl acrylate, hydroxyisopropyl acrylate and hydroxy-n-butyl acrylate.

Preferable hydroxyalkyl methacrylates are in particular hydroxyethyl methacrylate, hydroxy-n-propyl methacrylate, hydroxyisopropyl methacrylate and hydroxy-n-butyl methacrylate.

In addition to glycidyl acrylate and methacrylate, other olefinically unsaturated polymerizable compounds carrying at least one epoxide group can also be used as monomers containing epoxide groups. Suitable examples are reaction products of equimolar amounts of acrylic or methacrylic acid and diepoxide compounds, such as, for example, neopentylglycol diglycidyl ester. Reaction products of hydroxyl-containing, polymerizable monomers, such as, for example, hydroxyethyl acrylate, and diepoxides are also suitable as a monomer component containing epoxide groups for preparing the acrylate copolymer.

The acrylate copolymer preferably contains as component d 0.1 to 35% by weight, relative to the total amount of components a, b and c, of a copolymerizable vinyl compound.

The acrylate copolymer contains hydroxyl groups from component b. In the synthetic resin according to the invention, these hydroxyl groups have been reacted at least partially with a partially blocked diisocyanate and/or polyisocyanate. About half of the isocyanate groups are preferably blocked.

Diisocyanates suitable for this purpose are aliphatic compounds such as hexamethylene diisocyanate. In particular those diisocyanates are suitable which have differingly reactive isocyanate groups, such as isophorone diisocyanate, as well as aromatic diisocyanates, such as diisocyanatodiphenylmethane, and in particular those which have differingly reactive isocyanate groups, such as toluylene diisocyanate. The partial blocking can be carried out by a known process. Examples of compounds suitable for this purpose are phenol, o-cresol, ε-caprolactam, ethylhexanol, hexylglycol and other C-H-acidic compounds, such as acetylacetone, ethyl acetoacetate, diethyl malonate and mercaptans, such as arylmercaptans or alkylmercaptans.

The reaction of polymers containing hydroxyl groups with partially blocked diisocyanates or polyisocyanates is in itself known. It is described, for example, in U.S. Pat. No. 3,939,051.

The partially blocked diisocyanates or polyisocyanates, on the one hand, have on average at least one free isocyanate group per molecule and, on the other hand, on average at least one isocyanate group per molecule has been reacted with the blocking agent. This blocking agent is so chosen that it prevents a reaction of the blocked isocyanate groups at room temperature and is split off at an elevated temperature, so that the isocyanate group becomes reactive. The synthetic resin according to the invention is therefore stable at room temperature, while the isocyanate groups liberated at an elevated temperature, i.e. on baking, are available to crosslink the synthetic resin. They can then react with the epoxide groups of the acrylate copolymer originating from component c and form oxazolidinone rings. The synthetic resin according to the invention is thus self-crosslinking and does not require an additional hardener component.

The hydroxyl groups can be reacted with the partially blocked diisocyanate and/or polyisocyanate even before the copolymerization of components a, b and c. However, the reaction is carried out advantageously after the copolymerization as a polymer-analogous reaction.

Examples of suitable copolymerizable vinyl compounds (component d), are styrene, α-methylstyrene, p-chlorostyrene, vinyl acetate and the like.

The invention also relates to a process for preparing a synthetic resin based on an acrylate copolymer containing epoxide groups, which comprises copolymerizing (a) 20 to 90% by weight of an alkyl acrylate having 1 to 18 carbon atoms in the alkyl radical and/or a methacrylate having 1 to 20 carbon atoms in the alkyl radical, (b) 5 to 40% by weight of a hydroxyalkyl acrylate and/or methacrylate and (c) 5 to 40% by weight of glycidyl acrylate and/or methacrylate and/or one other olefinically unsaturated polymerizable compound carrying an epoxide group, the total amount of components a, b and c being 100%, and reacting the hydroxyl groups of component b before or after the copolymerization has been carried out at least partially with a partially blocked, diisocyanate and/or polyisocyanate.

The acrylate copolymer is prepared by the known polymerization methods, namely by bulk, solution, emulsion or bead polymerization. The solution polymerization is preferable, in particular when the partially blocked diisocyanates or polyisocyanates are added only after the polymerization. The various polymerization methods are well-known and described, for example, in Houben-Weyl, Methoden der ORGANISCHEN CHEMIE (Methods of ORGANIC CHEMISTRY), 4th edition, volume 14/1, pages 24 to 556 (1961).

In the solution polymerization, solvents such as benzene, toluene, xylene, acetone, methyl ethyl ketone, methyl isobutyl ketone, ethyl acetate, isopropanol, n-butanol, dichloromethane, chloroform, carbon tetrachloride or others can be used.

The polymerizations are carried out at temperatures of 50° to 170° C. The polymerization reaction is started with known polymerization initiators, in particular with peroxides and azo compounds. These polymerization initiators, but also mixtures of various polymerization initiators, are used in amounts of 0.5 to 5% by weight, relative to the original weight of monomers.

The additional use of chain transfer agents to regulate the molecular weight is advantageous. These are added in amounts of 0.1 to 5% by weight, relative to the original weight of the monomers. The chain transfer agents are compounds whose chain-regulating properties are in themselves known. Examples which may be mentioned are mercaptans, such as octylmercaptan, tert.-dodecylmercaptan, or laurylmercaptan, or thioglycolates, such as butyl, hexyl or isooctyl thioglycolate, or chlorinated compounds, such as dichloromethane, trichloromethane or carbon tetrachloride.

The polymerization is carried out in such a way that the number average of the molecular weight is between 1,000 and 30,000.

The reaction with the partially blocked diisocyanate or polyisocyanate takes place in a known way. For this purpose, the acrylate copolymer is advantageously present in solution. The partially blocked diisocyanate or polyisocyanate is added either in a solvent or in pure form. The reaction is carried out at 60° to 100° C. Reaction temperatures of about 80° C. are particularly suitable. The reaction is carried out until a content of free isocyanate of less than 1% is reached.

The invention also relates to the use of the synthetic resins described as binders in heat-hardenable baking finishes and in particular in powder finishes.

The term "powder finishes" is understood as meaning pigmented and non-pigmented coating agents in a solid, finely divided form and based on organic synthetic resins. Powder finishes of this type can be used for the electrostatic powder spray process and applied by means of this process to most metallic substrates. Application in the form of an aqueous suspension (as a slurry) and the EPC (electro powder coating) process, in which a suitable binder for the electrocoating process serves as an external phase of a powder suspension, are also known.

Regardless of how applied, the powder is then hardened by baking to give a surface coating adhering to the substrate.

The invention also relates to coating agents, in particular powder finishes, which contain, as essential binder, a synthetic resin based on an acrylate copolymer containing epoxide groups and having a number average molecular weight of 1,000 to 30,000. In these coating agents the acrylate copolymer comprises (a) 20 to 90% by weight of alkyl acrylate having 1 to 18 carbon atoms in the alkyl radical and/or a methacrylate having 1 to 20 carbon atoms in the alkyl radical, (b) 5 to 40% by weight of a hydroxyalkyl acrylate and/or methacrylate and (c) 5 to 40% by weight of glycidyl acrylate and/or methacrylate and/or one other olefinically unsaturated, polymerizable compound carrying an epoxide group, the total amount of components a, b and c being 100%, and the hydroxyl groups of the acrylate copolymer have been reacted before or after the copolymerization was carried out at least partially with a partially blocked diisocyanate and/or polyisocyanate.

The synthetic resin contained in the coating agents and powder finishes as essential binder advantageously contains as component d 0.1–35% by weight, relative to the total amount of components a, b and c, of a copolymerizable vinyl compound.

The coating agents, or powder finishes, according to the invention can contain pigments, leveling agents, catalysts, stabilizers and other auxiliaries known to an expert.

Suitable catalysts for the crosslinking, i.e. for the reaction of the epoxide groups with the isocyanate groups, are, for example, tertiary amines, such as trimethylamine, triethylamine, tetramethylbutanediamine and triethylenediamine, as well as other amines, such as dimethylaminoethanol, dimethylaminopentanol, tris-(dimethylaminoethyl)-phenol and N-methylmorpholine. Quaternary ammonium salts can also be used, such as cetyltrimethylammonium bromide, cetyltrimethylammonium chloride, dodecyltrimethylammonium iodide, trimethyldodecylammonium chloride, benzyldimethyltetradecylammonium chloride, benzyldimethylpalmitylammonium chloride, allyldodecyltrimethylammonium bromide, benzyldimethylstearylammonium bromide, stearyltrimethylammonium chloride and benzyldimethyltetradecylammonium acetate.

Imidazoles, such as 2-methylimidazole, 2-ethylimidazole, 2-undecylimidazole, 2-heptadecylimidazole, 2-methyl-4-ethylimidazole, 1-butylimidazole, 1-propyl-2-methylimidazole, 1-benzyl-2-methylimidazole, 1-cyanoethyl-2-methylimidazole, 1-cyanoethyl-2-undecylimidazole, 1-cyanoethyl-2-phenylimidazole, 1-(4,6-diamino-s-triazinyl-2-ethyl)-2-methylimidazole, 1-(4,6-diamino-s-triazinyl-2-ethyl)-2-ethylimidazole and 1-(4,6,-diamino-2-triazinyl-2-ethyl)-2-undecylimidazole, are also suitable.

The basic catalyst, i.e. the catalyst promoting hetero ring formation, is added in general in an amount of 0.01 to 10% by weight, relative to the total weight of polyepoxide and polyisocyanate.

Solvent-containing coating agents are prepared with the aid of known dispersing machines with the use of pigments, leveling agents, further known auxiliaries and solvents. The powder finishes are prepared by mixing the individual constituents with one another, homogenizing the resulting mixture by extruding it and comminuting the extrudate, after it has cooled down, to a powder. The homogenization is preferably carried out in an extruder at temperatures of 80° to 120° C. A kneader can also be used instead of an extruder, but an extruder is preferable. Under the conditions described, a homogeneous mixture is obtained which, even after cooling down, no longer demixes.

The mixtures thus prepared are brittle and can be ground down to a powder having a particle size of 25 to 120 μm. If desired, the powder can in addition be classified according to particle size.

The invention also relates to a process for preparing a surface coating, which comprises applying a coating agent in the form of a film by spraying, flow-coating, dipping, roller-coating or knife-coating to a substrate, the coating agent containing as an essential binder a synthetic resin based on an acrylate copolymer containing epoxide groups, having a number average molecular weight of 1,000 to 30,000 and comprising (a) 20 to 90% by weight of an alkyl acrylate having 1 to 18 carbon atoms in the alkyl radical and/or a methacrylate having 1 to 20 carbon atoms in the alkyl radical, (b) 5 to 40% by weight of a hydroxyalkyl acrylate and/or methacrylate and (c) 5 to 40% by weight of glycidyl acrylate and/or methacrylate and/or one other olefinically unsaturated, polymerizable compound carrying an epoxide group, the total amount of components, a b and c being 100%, and the hydroxyl groups of the acrylate copolymer having been reacted before or after the copolymerization was carried out at least partially with a partially blocked diisocyanate and/or polyisocyanate, and baking the film to give a firmly adhering surface coating.

The invention also relates to a process for preparing a surface coating, which comprises applying to a substrate, by the electrostatic powder spray process, a powder finish which contains, as essential binder, a synthetic resin based on an acrylate polymer containing epoxide groups, having a number average molecular weight of 1,000 to 30,000 and comprising (a) 20 to 90% by weight of an alkyl acrylate having 1 to 18 carbon atoms in the alkyl radical and/or a methacrylate having 1 to 20 carbon atoms in the alkyl radical, (b) 5 to 40% by weight of a hydroxyalkyl acrylate and/or methacrylate and (c) 5 to 40% by weight of glycidyl acrylate and/or methacrylate and/or one other olefinically unsaturated polymerizable compound carrying an epoxide group, the total amount of components a, b and c being 100%, and the hydroxyl groups of which have been reacted before or after the copolymerization was carried out at least partially with a partially blocked diisocyanate and/or polyisocyanate and baking the applied powder finish to give a firmly adhering surface coating.

The invention also relates to an article coated with a surface coating, wherein the surface coating has been obtained by applying, and subsequently baking, a coating agent which contains, as essential binder, an acrylate copolymer having a number average molecular weight of 1,000 to 30,000 and comprising (a) 20 to 90% by weight of an alkyl acrylate having 1 to 18 carbon atoms in the alkyl radical and/or a methacrylate having 1 to 20 carbon atoms in the alkyl radical, (b) 5 to 40% by weight of a hydroxyalkyl acrylate and/or methacrylate and (c) 5 to 40% by weight of glycidyl acrylate and/or methacrylate and/or one other olefinically unsaturated, polymerizable compound carrying an epoxide group, the total amount of components a, b and c being 100%, and the hydroxyl groups of which have been reacted before or after the copolymerization was carried out at least partially with a partially blocked diisocyanate and/or polyisocyanate.

The invention is illustrated in more detail by means of the Examples below.

EXAMPLE 1

Preparation of a semiblocked aromatic polyisocyanate.

1,966 g of toluylene diisocyanate are initially introduced into a dry 4 liter glass reaction vessel under nitrogen. 1,469 g of ethyl acetoacetate are slowly added. During this addition, the temperature must not exceed 80° C. After the addition is complete, the reaction is allowed to proceed until an isocyanate equivalent weight of 304 is reached.

EXAMPLE 2

Preparation of a semiblocked aliphatic polyisocyanate.

2,553 g of isophorone diisocyanate are initially introduced into a dry 4 liter glass reaction vessel under nitrogen. The temperature is raised to 70° C., and 1,000 g of methyl ethyl ketoxime are slowly added dropwise to the material initially introduced, the temperature during this addition not being allowed to exceed 80° C. After the addition is complete, the reaction is allowed to continue until the isocyanate equivalent weight of 310 is reached.

EXAMPLE 3

Preparation of a copolymer containing hydroxyl groups.

400 g of toluene are heated to 110° C. under nitrogen in a 6 liter flask. A mixture of 1,000 g of methyl methacrylate, 200 g of glycidyl methacrylate, 182 g of 2-hydroxypropyl acrylate, 3 g of ethylhexyl methacrylate, 300 g of isobutyl methacrylate, 20 g of dodecylmercaptan and 100 g of tert.-butyl peroctoate is added dropwise in the course of 4.5 hours. The batch is polymerized until a constant viscosity of 1.7 dpa in a 40% strength xylene solution is obtained. The temperature is then reduced to 80° C., and 425 g of the reaction product of Example 1 are added. The reaction is carried out until the content of free isocyanate is less than 1%. The solvent is then removed at 120° C. in vacuo. The melt obtained is poured onto a tray. After the resin has cooled down it is ground in a wing beater mill. The number average molecular weight, measured by gel permeation chromatography against a polystyrene calibration, is 2,100. The resin remains blocked at 50° C. for at least 5 hours and at 40° C. for at least 24 hours.

EXAMPLE 4

Preparation of a copolymer having blocked isocyanate groups.

560 g of toluene are initially introduced under nitrogen into a 6 liter flask and heated to the reflux temperature. A monomer mixture of 1,400 g of methyl methacrylate, 280 g of glycidyl methacrylate, 835 g of the rection product of hydroxyethyl acrylate and of the partially blocked polyisocyanate described in Example 2 and 840 g of ethylhexyl methacrylate, together with 14 g of dodecylmercaptan, is added dropwise in the course of 5 hours. 140 g of tert.-butyl peroctoate are metered in at the same time. The batch is then polymerized until a constant viscosity of 5.3 dpa, 50% strength in xylene, is obtained. 10 g of dodecyltrimethylammonium iodide are then added as crosslinking catalyst. The resin is worked up as above. The number average molecular weight, measured by gel permeation chromatography against a polystyrene calibration, is 2,700. The resin remains blocked at 50° C. for over 5 hours and at 40° C. for over 24 hours.

The fraction between 30 and 120 μm is sieved out of the powder comminuted in a wing beater mill. The resulting powder is sieved by means of a 100 μm sieve onto glass plates to give an approximately 75 μm thick film. The plates are baked for 25 minutes at 185° C. A completely non-porous, readily spreading, glossy surface coating is obtained.

EXAMPLE 5

100 g of the resin of Example 3, 1 g of diazobicyclooctane and 63 g of titanium dioxide (of the rutile type) are melted in a kneader at 110° C., and the resulting melt is homogenized and applied to a cold tray. The mixture is comminuted in a wing beater mill, and the fraction between 30 and 120 μm is sieved out. This powder fraction is then sieved by means of a 100 μm sieve onto glass plates to give an approximately 75 μm thick film. The coating is baked for 20 minutes at 180° C. High gloss, pure white surface coatings are obtained.

We claim:

1. A powder finish applied to a substrate containing as essential binder a synthetic resin based on an acrylate copolymer containing epoxide groups and having a number average molecular weight of 1,000 to 30,000, said acrylate copolymer comprising:
   (a) 20 to 90% by weight of a first acrylate selected from the group consisting of alkyl acrylate having 1 to 18 carbon atoms in the alkyl radical and alkyl methacrylate having 1 to 20 carbon atoms in the alkyl radical;
   (b) 5 to 40% by weight of a second acrylate having hydroxyl groups selected from the group consisting of hydroxyalkyl acrylate and hydroxyalkylmethacrylate; and
   (c) 5 to 40% by weight of monomers containing epoxide groups selected from the group consisting of glycidyl acrylate and glycidyl methacrylate, the total amount of components (a), (b) and (c) being 100%; and said hydroxyl groups of said second acrylate having been reacted in solution at 60°–100° C. with a partially blocked isocyanate selected from the group consisting of diisocyanate and polyisocyanate to a free isocyanate content of less than 1% and, upon subsequent baking at an elevated temperature, isocyanate groups are liberated from said blocked isocyanate to react with said epoxide groups of component (c) to form oxazolidinone rings.

2. A process for preparing a surface coating, which comprises applying a coating composition in the form of a film to a substrate, said coating composition containing as an essential binder a synthetic resin based on an acrylate copolymer containing epoxide groups, having a number average molecular weight of 1,000 to 30,000 and comprising:
   (a) 20 to 90% by weight of a first acrylate selected from the group consisting of alkyl acrylate having 1 to 8 carbon atoms in the alkyl radical and alkyl methacrylate having 1 to 20 carbon atoms in the alkyl radical;
   (b) 5 to 40% by weight of a second acrylate having hydroxyl groups selected from the group consisting of hydroxyalkylacrylate and hydroxyalkylmethacrylate; and
   (c) 5 to 40% by weight of monomers containing epoxide groups selected from the group consisting of glycidyl acrylate, and glycidyl methacrylate, the total amount of components (a), (b), and (c) being 100%, and said hydroxyl groups of said second acrylate having been reacted in solution at 60°–100° C. with a partially blocked isocyanate selected from the group consisting of diisocyanate and polyisocyanate to a free isocyanate content of less than 1% and subsequently baking said film at an elevated temperature to liberate isocyanate groups from said blocked isocyanate to react with said epoxide groups of component (c) to form oxazolidinone rings and to give a firmly adhering surface coating.

3. A process for preparing a surface coating, which comprises applying to a substrate, by the electrostatic powder spray process, a powder finish which contains, as essential binder, a synthetic resin based on an acrylate polymer containing epoxide groups having a number average molecular weight of 1,000 to 30,000 and comprising:
   (a) 20 to 90% by weight of a first acrylate selected from the group consisting of alkyl acrylate having 1 to 18 carbon atoms in the alkyl radical and alkyl methacrylate having 1 to 20 carbon atoms in the alkyl radical;
   (b) 5 to 40% by weight of a second acrylate having hydroxyl groups selected from the group consisting of hydroxyalkylacrylate and hydroxyalkylmethacrylate; and
   (c) 5 to 40% by weight of monomers containing epoxide groups selected from the group consisting of glycidyl acrylate, and glycidyl methacrylate, the total amount of components (a), (b), and (c) being 100%, and said hydroxyl groups of said second acrylate having been reacted in solution at 60°–100° C. with a partially blocked isocyanate selected from the group consisting of diisocyanate and polyisocyanate to a free isocyanate content of less than 1% and subsequently baking the applied powder finish at an elevated temperature to liberate isocyanate groups from said blocked isocyanate to react with said epoxide groups of component (c) to form oxazolidinone rings and to give a firmly adhering surface coating.

4. An article coated with a surface coating, wherein the surface coating has been obtained by applying, and subsequently baking, a coating agent which contains, as essential binder, an acrylate copolymer having a number average molecular weight of 1,000 to 30,000 and comprising:
   (a) 20 to 90% by weight of a first acrylate selected from the group consisting of alkyl acrylate having 1 to 18 carbon atoms in the alkyl radical and alkyl methacrylate having 1 to 20 carbon atoms in the alkyl radical;
   (b) 5 to 40% by weight of a second acrylate having hydroxyl groups selected from the group consisting of hydroxyalkylacrylate and hydroxyalkylmethacrylate; and
   (c) 5 to 40% by weight of monomers containing epoxide groups selected from the group consisting of glycidyl acrylate, and glycidyl methacrylate, the total amount of components (a), (b), and (c) being 100%, and said hydroxyl groups of said second acrylate having been reacted in solution at 60°–100° C. with a partially blocked isocyanate selected from the group consisting of diisocyanate and polyisocyanate to a free isocyanate content of less than 1% and, upon said subsequent baking at an elevated temperature, isocyanate groups are liberated from said blocked isocyanate to react with said epoxide groups of component (c) to form oxazolidinone rings.

5. The powder finish of claim 1, further comprising component (d) comprising 0.1 to 35% by weight, relative to the total amount of components (a), (b), and (c), of a copolymerizable vinyl compound.

6. The process of claim 2, further comprising component (d) comprising 0.1 to 35% by weight, relative to the total amount of components (a), (b) and (c), of a copolymerizable vinyl compound.

7. The process of claim 3, further comprising component (d) comprising 0.1 to 35% by weight, relative to the total amount of components (a), (b) and (c), of a copolymerizable vinyl compound.

8. The article of claim 4, further comprising component (d) comprising 0.1 to 35% by weight, relative to the total amount of components (a), (b), and (c), of a copolymerizable vinyl compound.

* * * * *